March 15, 1966  L. E. MYLTING  3,240,436
APPARATUS FOR BREAKING UP SOLIDS
Filed July 2, 1963  3 Sheets-Sheet 1

INVENTOR.
LAURITZ E. MYLTING
BY *B. D. Watts*
WATTS & FISHER
ATTORNEYS

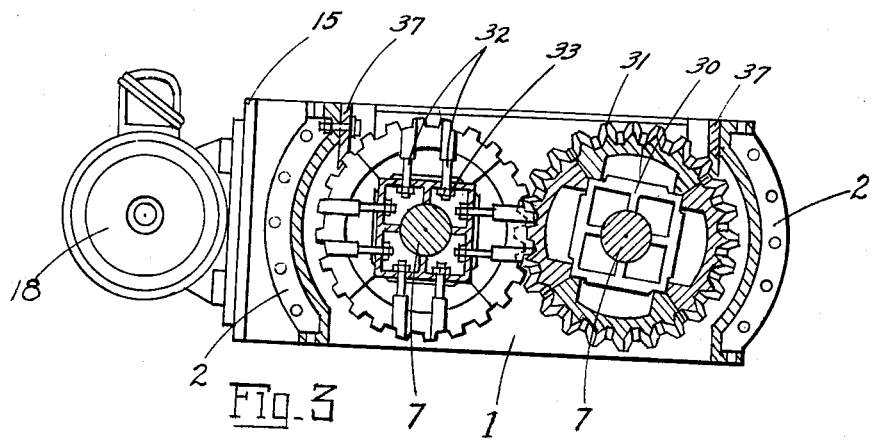
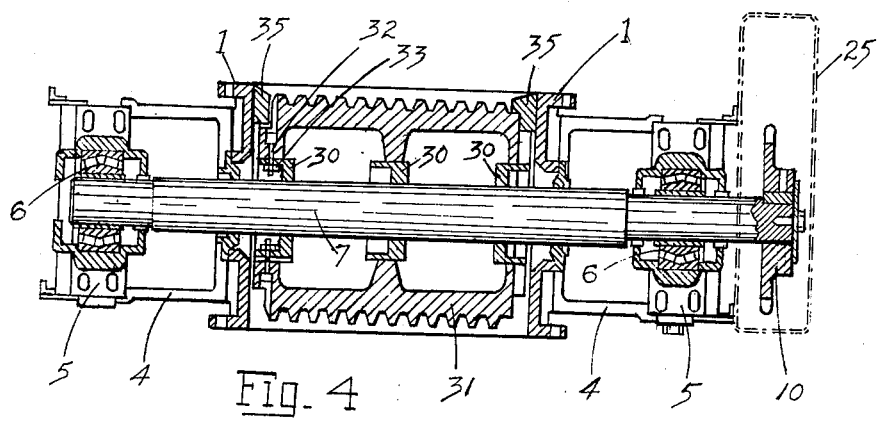

March 15, 1966   L. E. MYLTING   3,240,436
APPARATUS FOR BREAKING UP SOLIDS
Filed July 2, 1963   3 Sheets-Sheet 3

INVENTOR.
LAURITZ E. MYLTING
BY
WATTS & FISHER
ATTORNEYS

United States Patent Office
3,240,436
Patented Mar. 15, 1966

3,240,436
APPARATUS FOR BREAKING UP SOLIDS
Lauritz E. Mylting, Ardmore, Pa., assignor, by mesne assignments, to Buell Engineering Company, Inc., Lebanon, Pa., a corporation of Delaware
Filed July 2, 1963, Ser. No. 292,295
9 Claims. (Cl. 241—230)

This invention relates generally to the art of comminuting solids and is particularly concerned with new apparatus which is capable of reducing solids, such as glass articles in a wide range of sizes, to small size particles substantially free from slivers.

Prior conventional grinders for solids which have been satisfactory when used with certain solids have been quite unsatisfactory when attempts were made to use them to reduce glass in a wide range of sizes to small pieces. Usually, two grinders were employed in tandem for this purpose, the first one being constructed to accept the larger pieces of glass and break them into smaller pieces which could be accepted by a second grinder and by which they were further reduced in size. Even when so used in tandem, the conventional grinders permitted substantial quantities of glass in sliver form to pass between the rolls. Moreover, prior grinders could not be so accurately adjusted and timed as to prevent the formation of slivers and the like.

The present invention aims to provide apparatus which is capable of accepting large pieces of solids, particularly glass, and reducing them to pieces less than about 1" in maximum dimension without the production of any appreciable amount of slivers and in which the rolls may be so timed and adjusted as to create minimum clearance without actual contact between the rolls at any time.

The present invention attains these aims by means of the combination of elements disclosed in the following specification and illustrated in the accompanying drawings, in which:

FIG. 3 is a vertical sectional view taken on line 3—3 of FIG. 1;

FIG. 4 is a vertical sectional view partly in elevation taken on line 4—4 of FIG. 1;

Figure 1:
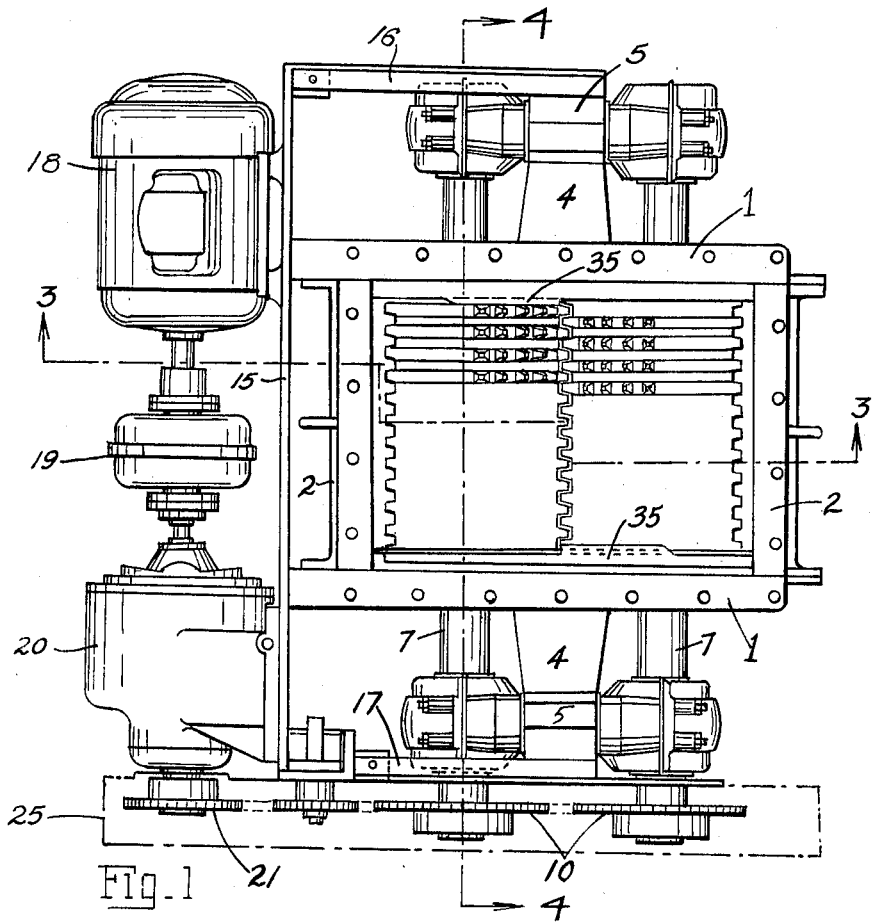
FIG. 1 is a top plan view of a preferred form of apparatus embodying the present invention.
Figure 2:
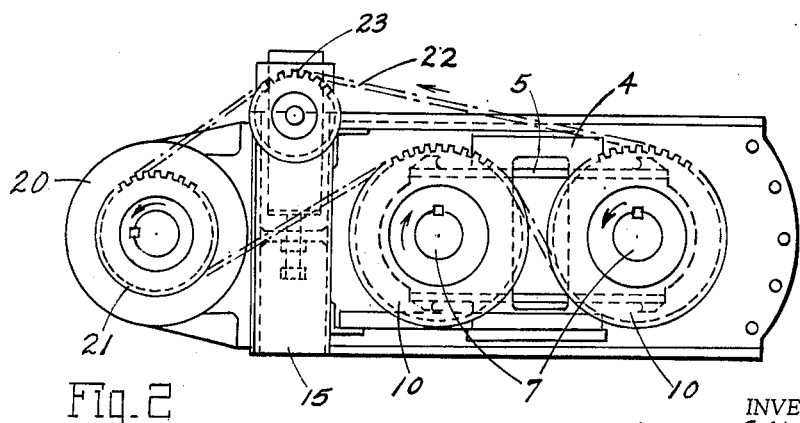
FIG. 2 is an end elevational view of the apparatus shown in FIG. 1.

FIGS. 1 to 7 show a preferred embodiment of the present invention. The illustrated apparatus includes a rectangluar frame consisting of vertical side walls 1, and end walls 2 which define a vertical space through the frame. Extensions 4 are attached to, and project outwardly from, the opposite side walls 1 and each such extension carries a horizontal member 5 in which roller bearings 6 are mounted. Parallel shafts 7 extend through side walls 1 and are rotatably mounted near their ends in bearings 6. Sprockets 10 are mounted on one end of each of shafts 7.

Shaft drive mechanism is positioned at one end of the frame. This mechanism includes a support member 15 which extends across the frame and is attached to the ends of the side walls 1 and has legs 16 and 17 which are attached to extensions 4. The shafts 7 extend through leg 17 and the sprockets 10 are positioned outside of leg 17. A motor 18 is mounted on support member 15 and is connected through a clutch 19 with gear reducer 20 which has sprocket 21 on its output shaft. An endless link chain 22 is trained over sprockets 21 and 10 and also over an idler sprocket 23 which serves to adjust the tension on the chain 22. It will be noted from FIG. 2 that chain 22 is so trained around sprockets 10 as to rotate shafts 7 in opposite directions with their adjacent parts rotating downwardly. A safety guard 25 enclosed the sprockets 10 and 21.

Each shaft 7 is provided with solids comminuting means. As is better shown in FIGS. 3 and 4, this means includes several spiders 30 fixed to the shafts 7 and cylindrical rolls secured to the spiders. Each roll is composed of arcuate segments 31 which are secured to the end spiders 30, as by bolts 32 and nuts 33 while the mid-parts of the segments rest on the middle spiders 30 but are not fixedly attached thereto.

Check plates 35 are attached to side members 1 over the outer ends of each roll to prevent solids from passing down between the ends of the rolls and the opposing sides of the frame. Vertical plates 37 are attached to the ends 2 of the frame and extend lengthwise of the rolls to prevent passage of solids between the rolls and the ends of the frame.

Figure 6:
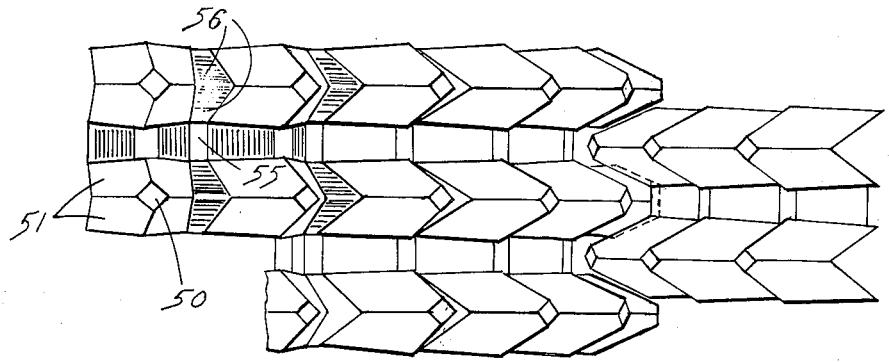
FIG. 6 is a plan view of segments of FIG. 5.
Figure 5:
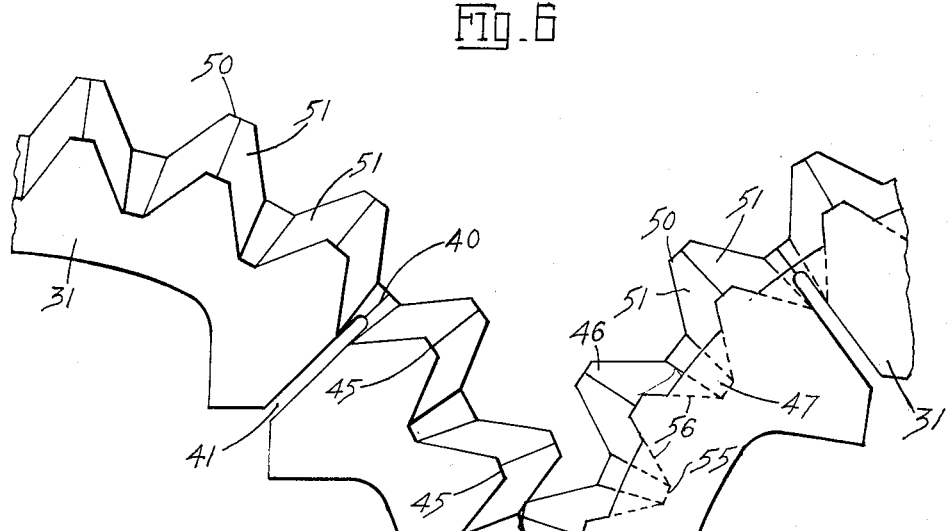
FIG. 5 is a fragmentary enlarged end elevational view of roll segments of FIG. 3.
Figure 7:
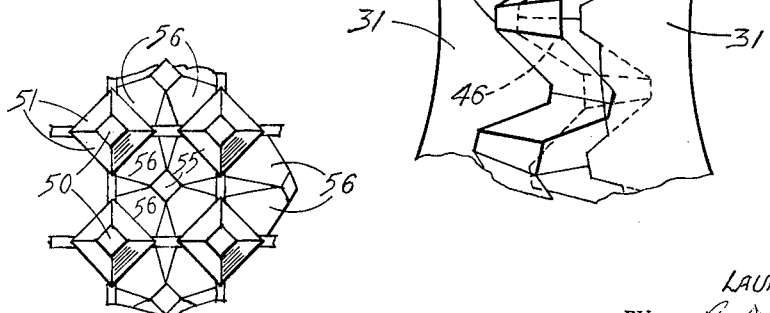
FIG. 7 is a fragmentary plan view showing the arrangement of teeth and depressions on the rolls.

Portions of segments 31 of the rolls are shown in FIGS. 5, 6 and 7. In FIG. 5 adjacent segments 31 contact one another only near their outer peripheries, as at 40, the remaining radially short contact areas between the segments being spaced apart slightly as is indicated at 41. By reason of this radially short contact, the segments may be properly located on the spiders and relative to one another and they may be drawn down into seating contact with the spiders by bolts 32 and nuts 33 without the creation of stresses which might cause the segments to crack or break.

Each of the several segments 31 of each roll may be regarded as having a cylindrical surface or pitch line 45 with a plurality of rows of circumferential spaced teeth 46 tapering outwardly therefrom and with a plurality of rows of circumferentially spaced depressions 47 tapering inwardly from that pitch line, the surface of the teeth 46 and the depressions 47 being faceted or pyramidal shaped.

The rows of teeth and depressions are arranged alternately along and in planes perpendicular to the axis of the rolls. As is better shown in FIGS. 6 and 7, each tooth 46 has an outer end surface 50 and four side surfaces 51 and each depression 47 has an inner end surface 55 and four side surfaces 56, said side surfaces being substantially contiguous to the surface 51 of the teeth 46. The depressions 47 correspond in configuration to, but are slightly larger than, the teeth 46. As FIG. 7 shows, each depression is largely defined by one surface of each of the four adjacent teeth.

As FIG. 5 clearly indicates, the two rolls are so adjusted that each tooth 46 of one wall will move into a depression 47 of the other wall as the rolls rotate and each tooth approaches the horizontal plane passing through the longitudinal center line of the shafts 7; and will move out of that depression as the tooth and depressions pass below that horizontal plane.

It will be understood that none of the surfaces of the teeth actually contact the surfaces of the depressions and that since there is little clearance between the surfaces of the teeth and depressions, precise timing or positioning of the rolls relative to each other is important in order that the surfaces of the teeth and depressions may approach close to one another but not actually touch. Such close positioning insures that solids which pass between the rolls will be reduced to dimensions at least no larger than the spaces between the walls of the teeth and depressions.

Such timing and positioning of the grinders is made possible by providing the driven sprockets 10 on the shafts with a certain number of teeth and providing more or fewer teeth and depressions on the rolls. For example, the illustrated rolls have 24 teeth in each row and 24 depressions in each row while each sprocket 10 has 25 teeth. If the rolls are not initially positioned as just described, the chain may be lifted out of engagement with one sprocket 10 and that roll may be rotated through 1/25 of a complete revolution, i.e. far enough for a given chain link to engage the next tooth on the sprocket of that roll when the chain is reassembled therewith. This will result in a variation of the rolls relative to each other in the ratio of 25 to 24 which results in very slight relative rotational movement of the two rolls and makes it possible to obtain the above described very accurate setting of the teeth and depressions. If necessary, one roll may be rotated a distance equivalent to more than one tooth.

It will be understood from the drawings that comparatively large pieces of solids may be accepted by the rolls and progressively broken down into the sizes permitted by the spacing between the teeth and depressions. For example, 3″ thick slabs of glass and whole TV tube fronts may be accepted by the grinders and reduced to a small size. In accepting these larger pieces, the teeth on the rolls first grasp and break the large pieces and the thus produced medium size pieces are broken into smaller pieces by the teeth as they approach one another. Finally, the small pieces are broken by the teeth in the depressions. As illustrative of the effectiveness of the present invention, it may be mentioned that the above described apparatus has satisfactorily handled glass articles which ranged from minor slides only about 7/1000 of an inch through 3″ thick slabs of glass and whole TV tube fronts with intermediate sizes such as 1/4″ tubing and mechanical ware and the like. All these various articles of different sizes and shapes were reduced to less than about 1″ in diameter and about 95% of the resulting fines were less than —3/4 mesh. Equally important was the fact that no slivers were produced which fact is traceable to the angular positioning of, and close clearance between, the surfaces of the teeth and their matching depressions.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. Apparatus for breaking up solids comprising a rectangular frame including vertical side and end walls defining a vertical space, extensions secured to the opposite side walls, shaft bearings supported by said extensions, shafts extending through said side walls and rotatably mounted in said bearings, driven sprockets secured to one end of each of said shafts and having the same number of chain engaging teeth, shaft driving means secured to one of said end walls and including a drive sprocket and an endless link chain engageable with the teeth of said driven sprockets, and spiders secured to each shaft, cylindrical rolls composed of arcuate segments and secured to said shafts between said side walls, each roll having alternate side-by-side circumferential rows of outwardly projecting tapering teeth and inwardly extending tapering depressions, the number of teeth in each row of teeth and the number of depressions in each row being different by one from the number of teeth on the driven sprockets, the rolls being so positioned relative to one another that when the rolls are rotated the teeth on each roll will enter the depressions in the other roll with a minimum clearance between the surfaces of said teeth and depressions.

2. Apparatus for breaking up solids comprising a frame having walls defining a space, rotatable shafts positioned in said space, means for rotating said shafts, and means carried on each shaft for engaging and crushing the solids, said means including a body having a surface, rows of outwardly tapering spaced-apart teeth projecting from the surface of the body and rows of correspondingly inwardly tapering depressions recessed below the surface of the body and located between the rows of teeth, the shafts being positioned relative to one another such that rotation of the shafts by the rotating means causes the teeth on each body to enter the depressions in the other body with a minimum clearance between surfaces of the teeth and the surfaces of the depressions.

3. Apparatus according to claim 2 in which the shaft driving means includes sprockets attached to the shafts and having chain engaging teeth, the number of teeth on each sprocket differing by one from the number of teeth in each row on the body.

4. Apparatus according to claim 2 wherein the bodies include arcuate segments of cylinders mounted on the shafts and extending longitudinally thereof, the surfaces of the segments on each shaft forming the said body surface and the said body surface being cylindrical.

5. Apparatus according to claim 2 wherein the surfaces of the teeth and of the depressions are faceted.

6. Apparatus according to claim 5 wherein the teeth and depressions are pyramidal shaped, each having an end surface and four similar side surfaces, the side surfaces of the teeth extending divergingly inward from the end surface thereof and the side surfaces of the depressions extending divergingly outward from the end surface thereof.

7. Apparatus according to claim 6 wherein the side surfaces of each depression are substantially contiguous to the side surfaces of the adjacent teeth.

8. Apparatus according to claim 4 wherein the rows of teeth and depressions on each body lie in planes perpendicular to the axis of the shaft.

9. Apparatus for breaking up solids comprising a frame having walls defining a space, shafts rotatably mounted in opposite ones of the walls and positioned in the space, means for rotating the shafts, spiders secured to the shafts, and arcuate segments of cylinders secured to the spiders and extending longitudinally of the shafts, the segments on each shaft forming a body having a cylindrical surface concentric with the axis of rotation of the shaft, spaced-apart rows of outwardly tapering circumferentially spaced-apart teeth projecting from the said cylindrical surface on each body and rows of correspondingly inwardly tapering circumferentially spaced-apart depressions recessed below the said body surface and disposed between the rows of teeth, the shafts being positioned relative to one another such that rotation thereof causes the teeth on each body to enter the depressions in another body with a minimum clearance between the surfaces of the teeth and the surfaces of the depressions.

References Cited by the Examiner

UNITED STATES PATENTS

| Re. 142 | 9/1849 | Battin | 241—235 |
| 3,438 | 2/1844 | Battin | 241—235 |
| 1,058,948 | 4/1913 | Clark | 241—295 |

ROBERT C. RIORDON, *Primary Examiner.*

J. SPENCER OVERHOLSER, *Examiner*